United States Patent
Nazarpoor et al.

(10) Patent No.: US 9,427,730 B2
(45) Date of Patent: Aug. 30, 2016

(54) BIMETALLIC SYNERGIZED PGM CATALYST SYSTEMS FOR TWC APPLICATION

(71) Applicant: Clean Diesel Technologies, Inc., Oxnard, CA (US)

(72) Inventors: Zahra Nazarpoor, Camarillo, CA (US); Stephen J. Golden, Santa Barbara, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 0 days.

(21) Appl. No.: 14/543,536

(22) Filed: Nov. 17, 2014

(65) Prior Publication Data
US 2016/0136621 A1    May 19, 2016

(51) Int. Cl.
*B01D 53/56* (2006.01)
*B01D 53/94* (2006.01)
*B01J 8/02* (2006.01)
(Continued)

(52) U.S. Cl.
CPC .......... *B01J 23/8892* (2013.01); *B01D 53/945* (2013.01); *B01J 21/04* (2013.01); *B01J 23/005* (2013.01); *B01J 23/20* (2013.01); *B01J 23/464* (2013.01); *B01J 35/0006* (2013.01); *B01D 2255/1023* (2013.01); *B01D 2255/1025* (2013.01); *B01D 2255/207* (2013.01); *B01D 2255/2073* (2013.01); *B01D 2255/2092* (2013.01); *B01D 2255/20715* (2013.01);
(Continued)

(58) Field of Classification Search
CPC ........ B01J 21/066; B01J 23/005; B01J 23/40; B01J 23/42; B01J 23/44; B01J 23/46; B01J 23/656; B01J 23/72; B01J 23/8926; B01J 23/8986; B01D 53/945

USPC ......... 502/241, 242, 244, 245, 261, 262, 324, 502/331, 333, 334, 339, 345, 349, 439, 502/524; 423/213.5
See application file for complete search history.

(56) References Cited

U.S. PATENT DOCUMENTS

| 4,188,309 A | 2/1980 | Volker et al. |
| 4,274,981 A * | 6/1981 | Suzuki ................ B01D 53/945 |
| | | 423/213.5 |

(Continued)

OTHER PUBLICATIONS

International Search Report and Written Opinion from International Patent Application No. PCT/US2015/61125 dated Feb. 8, 2016.

*Primary Examiner* — Cam N. Nguyen
(74) *Attorney, Agent, or Firm* — Alston & Bird LLP

(57) ABSTRACT

Bimetallic Synergized Platinum Group Metals (SPGM) catalyst systems for TWC application are disclosed. Disclosed bimetallic SPGM catalyst systems may include a washcoat with a Cu—Mn spinel structure and an overcoat that includes PGMs, such as Pd/Rh or Pt/Rh supported on carrier material oxides, such as alumina. Bimetallic SPGM catalyst systems show significant improvement in nitrogen oxide reduction performance under lean operating conditions, which allows a reduced consumption of fuel. Additionally, disclosed bimetallic SPGM catalyst systems exhibit enhanced catalytic activity for carbon monoxide conversion. Furthermore, bimetallic SPGM catalyst systems are found to have enhanced catalytic activity for fresh, hydrothermally aged and fuel cut aged conditions compared to PGM catalyst system, showing that there is a synergistic effect between PGM catalyst and Cu—Mn spinel within the disclosed SPGM catalyst system which help in performance and thermal stability of disclosed SPGM catalyst systems.

32 Claims, 12 Drawing Sheets

(51) Int. Cl.
*B01J 21/00* (2006.01)
*B01J 21/04* (2006.01)
*B01J 23/00* (2006.01)
*B01J 23/02* (2006.01)
*B01J 23/32* (2006.01)
*B01J 23/42* (2006.01)
*B01J 23/44* (2006.01)
*B01J 23/70* (2006.01)
*B01J 23/72* (2006.01)
*B01J 23/889* (2006.01)
*B01J 23/46* (2006.01)
*B01J 23/20* (2006.01)
*B01J 35/00* (2006.01)

(52) U.S. Cl.
CPC ... *B01D2255/20761* (2013.01); *B01D 2255/40* (2013.01); *B01D 2255/405* (2013.01)

(56) References Cited

U.S. PATENT DOCUMENTS

| | | | | |
|---|---|---|---|---|
| 4,367,162 A | | 1/1983 | Fujitani et al. | |
| 5,162,284 A | * | 11/1992 | Soled | B01J 23/005 502/324 |
| 5,238,898 A | * | 8/1993 | Han | C07C 2/84 502/321 |
| 5,364,517 A | * | 11/1994 | Dieckmann | B01D 53/8628 208/113 |
| 6,395,244 B1 | * | 5/2002 | Hartweg | B01D 53/9422 423/210 |
| 6,696,389 B1 | * | 2/2004 | Boegner | B01D 53/9418 502/325 |
| 8,845,987 B1 | | 9/2014 | Nazarpoor et al. | |
| 2004/0151647 A1 | * | 8/2004 | Wanninger | B01D 53/864 423/247 |
| 2009/0324469 A1 | * | 12/2009 | Golden | B01D 53/945 423/212 |
| 2010/0180581 A1 | | 7/2010 | Grubert et al. | |
| 2014/0271384 A1 | * | 9/2014 | Nazarpoor | B01D 53/945 422/168 |
| 2014/0271387 A1 | * | 9/2014 | Nazarpoor | B01J 23/8892 422/170 |
| 2014/0271388 A1 | * | 9/2014 | Nazarpoor | B01J 23/8892 422/170 |
| 2014/0274677 A1 | * | 9/2014 | Nazarpoor | B01J 23/8892 502/324 |
| 2014/0336044 A1 | * | 11/2014 | Nazarpoor | B01J 23/8892 502/303 |
| 2014/0357475 A1 | * | 12/2014 | Nazarpoor | B01J 23/8892 502/73 |
| 2015/0148223 A1 | * | 5/2015 | Nazarpoor | B01J 23/8892 502/324 |
| 2015/0148224 A1 | * | 5/2015 | Nazarpoor | B01J 23/8986 502/324 |
| 2015/0148225 A1 | * | 5/2015 | Nazarpoor | B01J 23/8986 502/324 |
| 2015/0182951 A1 | * | 7/2015 | Nazarpoor | B01J 23/8892 378/73 |
| 2015/0238940 A1 | * | 8/2015 | Nazarpoor | B01J 23/8892 502/324 |
| 2015/0238941 A1 | * | 8/2015 | Nazarpoor | B01J 23/8892 502/324 |
| 2015/0290627 A1 | * | 10/2015 | Nazarpoor | B01D 53/944 502/324 |
| 2015/0290630 A1 | * | 10/2015 | Nazarpoor | B01J 23/8892 502/324 |
| 2015/0352529 A1 | * | 12/2015 | Nazarpoor | B01J 23/8892 502/241 |

* cited by examiner

BIMETALLIC SYNERGIZED PGM CATALYST SYSTEMS FOR TWC APPLICATION

CROSS-REFERENCE TO RELATED APPLICATIONS

N/A

BACKGROUND

1. Technical Field

The present disclosure relates generally to bimetallic PGM catalyst systems, and, more particularly, to synergized PGM catalyst systems with lean and rich performance improvement.

2. Background Information

Carbon dioxide emitted from an internal combustion engine of an automobile and others has been a problem from the standpoint of protection of the global environment. A lean burn engine using less fuel provides a promising solution to this problem.

TWC systems may include bimetallic catalysts, which may be based on Platinum group metals (PGMs), including Pt—Rh, Pt—Pd, Pd—Rh, among others. A catalyst including a NOx storage material, such as alkali metals, as well as noble metals, which are normally used as a catalyst for purifying NOx and CO included in exhaust gas. This type of catalyst may absorb NOx included in the exhaust gas into the NOx storage material. When fuel concentration in the exhaust gas becomes rich, the absorbed NOx is removed by the action of the noble metal.

Since the fuel concentration in the exhaust gas of the aforementioned lean burn engine is low, conventional catalyst has been unable to sufficiently purify NOx. Also, due to a low melting point of alkali metal as the NOx storage material, the alkali metal migrates and is solid-solutioned into the catalyst substrate when the catalyst is heated to high temperatures. As a result, performance of the catalyst is lowered.

Therefore, there is a need to provide improved synergized PGM catalyst systems for exhaust gas purifying catalyst that may include bimetallic PGM catalyst to exhibit high NOx and CO purification performance even in a lean burn engine, and that do not allow deterioration of catalytic performance at high temperatures, improving the nitrogen oxide conversion under stoichiometric operating conditions and especially under lean operating conditions which may allow reduced consumption of fuel.

SUMMARY

The present disclosure provides bimetallic Synergized Platinum Group Metals (SPGM) catalyst systems which may exhibit high catalytic activity, under both lean condition and rich condition, and thus enhanced NOx and CO conversion compared to bimetallic PGM catalyst systems.

According to an embodiment, bimetallic SPGM catalyst system may include at least a substrate, a washcoat, and an overcoat, where substrate may include a ceramic material, washcoat may include a Cu—Mn spinel structure supported on doped $ZrO_2$, and overcoat may include bimetallic PGM catalysts, such as Palladium/Rhodium (Pd/Rh) or Platinum/Rhodium (Pt/Rh) supported on carrier material oxides, such as alumina.

In order to compare performance and determine synergism of Cu—Mn spinel with Pd/Rh and Pt/Rh catalysts, bimetallic PGM catalyst systems without Cu—Mn spinel structure may be prepared, where PGM catalyst system may include a ceramic material, a washcoat that may include doped $ZrO_2$, and an overcoat may include PGM catalysts, such as Pd/Rh or Pt/Rh supported on carrier material oxides, such as alumina.

Disclosed SPGM catalyst system may be prepared using suitable known in the art synthesis method, such as co-milling process, and co-precipitation process, among others.

According to one aspect of the present disclosure, fresh, hydrothermally aged (at 900° C. during about 4 hours), and fuel cut aged (at 800° C. during about 20 hours) samples of disclosed bimetallic SPGM catalyst systems and of bimetallic PGM catalyst systems may be prepared, including very low amount of PGM such as Pd loadings of about 0.5 g/ft$^3$, and Rh loading of about 0.5 g/ft$^3$ for Pd/Rh bimetallic SPGM catalyst system, and Pt loadings of about 0.5 g/ft$^3$, and Rh loading of about 0.5 g/ft$^3$ for Pt/Rh bimetallic SPGM catalyst system, in order to compare catalytic activity and determine synergistic property of disclosed bimetallic SPGM catalyst systems (including Cu—Mn spinel) with bimetallic PGM catalyst systems (without Cu—Mn spinel).

Catalytic activity in fresh, hydrothermally aged (at 900° C. during about 4 hours), and fuel cut aged (at 800° C. during about 20 hours) samples of disclosed SPGM catalyst system and of PGM catalyst system may be determined by performing isothermal steady state sweep tests under stoichiometric conditions, in a range of rich to lean conditions, and compared with results for disclosed SPGM catalyst system with PGM catalyst systems.

Bimetallic SPGM catalyst system of the present disclosure may show significant improvement in nitrogen oxide conversion under stoichiometric operating conditions and especially under lean operating conditions which may allow reduced consumption of fuel. It has been shown that the enhanced catalytic activity is produced by the synergistic effect of Cu—Mn spinel on PGM catalysts. Furthermore, disclosed SPGM catalyst system that includes a Cu—Mn spinel may enable the use of a catalyst converter that includes low amounts of bimetallic PGM.

Numerous other aspects, features and benefits of the present disclosure may be made apparent from the following detailed description taken together with the drawing figures.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

Figure 1:
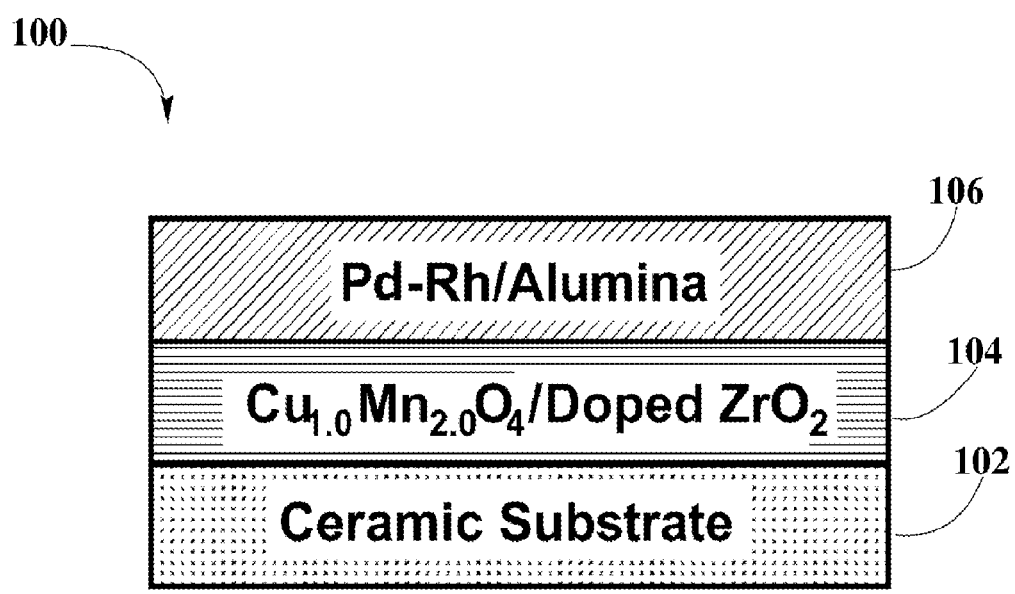
FIG. 1 shows a bimetallic SPGM catalyst system configuration with Cu—Mn spinel referred as SPGM catalyst system Type 1, according to an embodiment.

In the following detailed description, reference is made to the accompanying drawings, which form a part hereof. In the drawings, which are not to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

Definitions

As used here, the following terms may have the following definitions:

"Catalyst system" refers to a system of at least two layers including at least one substrate, a washcoat, and/or an overcoat.

"Substrate" refers to any material of any shape or configuration that yields a sufficient surface area for depositing a washcoat and/or overcoat.

"Washcoat" refers to at least one coating including at least one oxide solid that may be deposited on a substrate.

"Overcoat" refers to at least one coating that may be deposited on at least one washcoat layer.

"Catalyst" refers to one or more materials that may be of use in the conversion of one or more other materials.

"Milling" refers to the operation of breaking a solid material into a desired grain or particle size.

"Co-precipitation" refers to the carrying down by a precipitate of substances normally soluble under the conditions employed.

"Calcination" refers to a thermal treatment process applied to solid materials, in presence of air, to bring about a thermal decomposition, phase transition, or removal of a volatile fraction at temperatures below the melting point of the solid materials.

"Platinum group metals (PGM)" refers to platinum, palladium, ruthenium, iridium, osmium, and rhodium.

"Synergized platinum group metal (SPGM) catalyst" refers to a PGM catalyst system which is synergized by a non-PGM group metal compound under different configuration.

"Treating," "treated," or "treatment" refers to drying, firing, heating, evaporating, calcining, or mixtures thereof.

"Three-Way Catalyst" refers to a catalyst that may achieve three simultaneous tasks: reduce nitrogen oxides to nitrogen and oxygen, oxidize carbon monoxide to carbon dioxide, and oxidize unburnt hydrocarbons to carbon dioxide and water.

"R-Value" refers to the number obtained by dividing the reducing potential by the oxidizing potential.

"Lean condition" refers to exhaust gas condition with an R-value below 1.

"Rich condition" refers to exhaust gas condition with an R value above 1.

"Stoichiometric condition" refers to the condition when the oxygen of the combustion gas or air added equals the amount for completely combusting the fuel.

"Conversion" refers to the chemical alteration of at least one material into one or more other materials.

"Spinel" refers to any of various mineral oxides of magnesium, iron, zinc, or manganese in combination with aluminum, chromium, copper or iron with $AB_2O_4$ structure.

Description of the Drawings

The present disclosure may generally provide bimetallic synergized PGM (SPGM) catalyst systems which may have enhanced catalytic performance of PGM catalyst under both lean condition and rich condition, by incorporating more active components into phase materials possessing three-way catalyst (TWC) properties.

Embodiments of the present disclosure provide catalyst performance comparison of disclosed bimetallic SPGM catalyst systems and bimetallic PGM catalyst systems that may include Palladium/Rhodium (Pd/Rh) bimetallic catalysts or Platinum/Rhodium (Pt/Rh) bimetallic catalysts within the overcoat of disclosed SPGM catalyst systems, and PGM catalyst system.

According to embodiments in the present disclosure, bimetallic SPGM catalyst systems may be configured with a washcoat including stoichiometric Cu—Mn spinel with doped $ZrO_2$ support oxide such as Niobium-Zirconia, an overcoat including bimetallic PGM catalysts, such as Pd/Rh and Pt/Rh with alumina-based support, and suitable ceramic substrate, here referred as SPGM catalyst system Type 1 (Pd/Rh), and SPGM catalyst system Type 3 (Pt/Rh). According to embodiments in the present disclosure, bimetallic PGM catalyst systems may be configured with washcoat layer including doped $ZrO_2$ support oxide such as Niobium-Zirconia, an overcoat including bimetallic PGM catalysts, such as Pd/Rh and Pt/Rh with alumina-based support, and suitable ceramic substrate, here referred as PGM catalyst system Type 2 (Pd/Rh), and PGM catalyst system Type 4 (Pt/Rh).

Catalyst System Configuration

FIG. 1 shows a bimetallic SPGM catalyst system configuration referred as SPGM catalyst system Type 1 100, according to an embodiment.

As shown in FIG. 1, SPGM catalyst system Type 1 100 may include at least a substrate 102, a washcoat 104, and an overcoat 106, where washcoat 104 may include a Cu—Mn spinel structure, $Cu_{1.0}Mn_{2.0}O_4$, supported on doped $ZrO_2$ and overcoat 106 may include two PGM catalysts, such as Palladium (Pd) and Rhodium (Rh), which may be supported on carrier material oxides, such as alumina.

Figure 2:
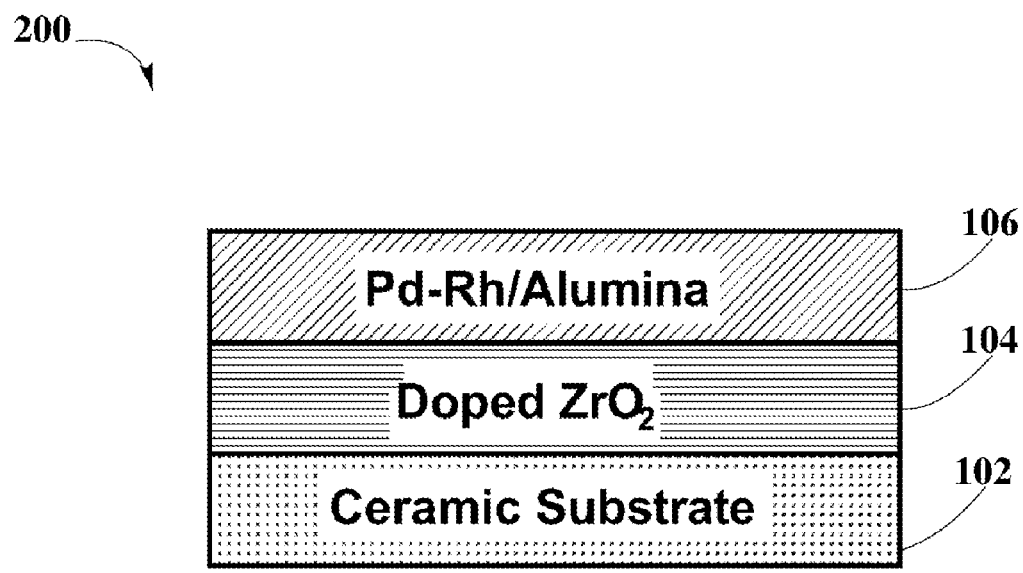
FIG. 2 illustrates a bimetallic PGM catalyst system configuration with no Cu—Mn spinel referred as PGM catalyst system Type 2, according to an embodiment.

FIG. 2 illustrates a bimetallic PGM catalyst system configuration referred as PGM catalyst system Type 2 200, according to an embodiment.

As shown in FIG. 2, PGM catalyst system Type 2 200 may include at least a substrate 102, a washcoat 104, and an overcoat 106, where washcoat 104 may include doped $ZrO_2$ and overcoat 106 may include carrier material oxides, such as alumina mixed with two PGM catalyst, such as Pd, and Rh.

Figure 3:
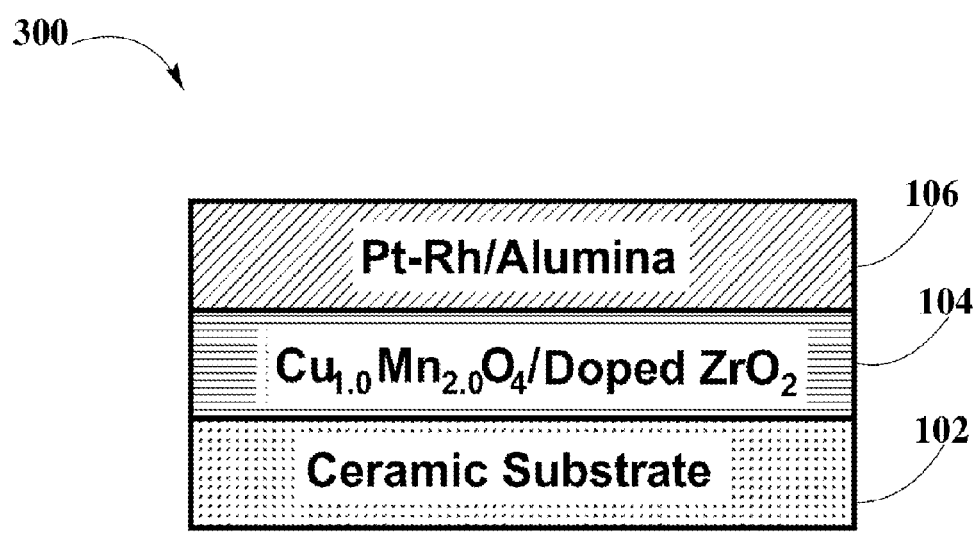
FIG. 3 shows a bimetallic SPGM catalyst system configuration with Cu—Mn spinel referred as SPGM catalyst system Type 3, according to an embodiment.

FIG. 3 shows a bimetallic SPGM catalyst system configuration with Cu—Mn spinel referred as SPGM catalyst system Type 3 300, according to an embodiment.

As shown in FIG. 3, SPGM catalyst system Type 3 300 may include at least a substrate 102, a washcoat 104, and an overcoat 106, where washcoat 104 may include a Cu—Mn spinel structure, $Cu_{1.0}Mn_{2.0}O_4$, supported on doped $ZrO_2$ and overcoat 106 may include two PGM catalysts, such as Platinum (Pt) and Rhodium (Rh), which may be supported on carrier material oxides, such as alumina.

Figure 4:
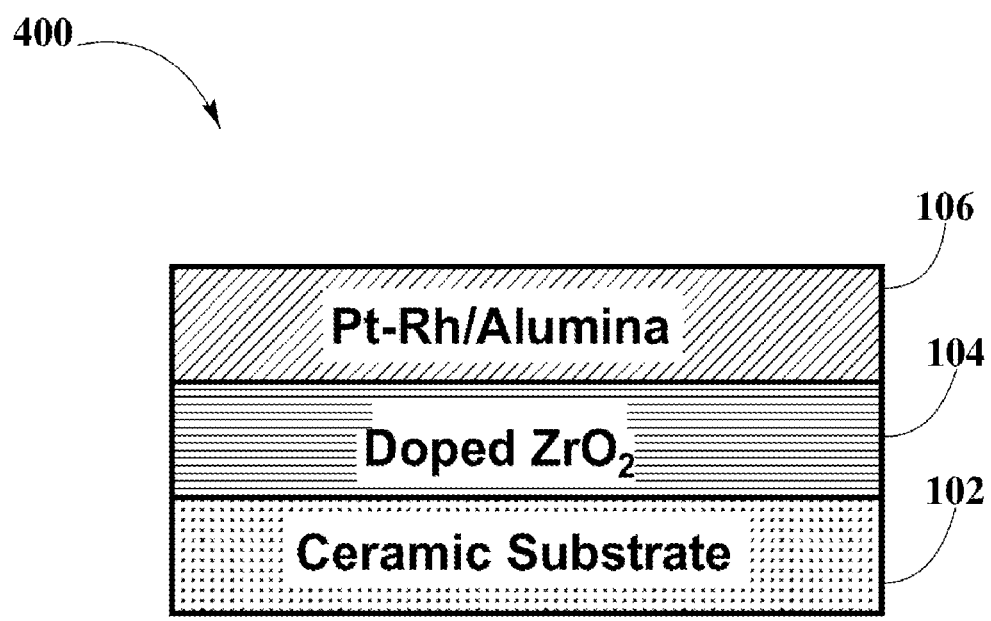
FIG. 4 illustrates a bimetallic PGM catalyst system configuration with no Cu—Mn spinel referred as PGM catalyst system Type 4, according to an embodiment.

FIG. 4 illustrates a bimetallic PGM catalyst system configuration with no Cu—Mn spinel referred as PGM catalyst system Type 4 400, according to an embodiment.

As shown in FIG. 4, PGM catalyst system Type 4 400 may include at least a substrate 102, a washcoat 104, and an overcoat 106, where washcoat 104 may include doped $ZrO_2$ and overcoat 106 may include carrier material oxides, such as alumina mixed with two PGM catalyst, such as Pt, and Rh.

In an embodiment, substrate 102 materials for SPGM catalyst system Type 1 100, PGM catalyst system Type 2 200, SPGM catalyst system Type 3 300, and PGM catalyst system Type 4 400 may include a refractive material, a ceramic material, a honeycomb structure, a metallic material, a ceramic foam, a metallic foam, a reticulated foam, or suitable combinations, where substrate 102 may have a plurality of channels with suitable porosity. Porosity may vary according to the particular properties of substrate 102 materials. Additionally, the number of channels may vary depending upon substrate 102 used as is known in the art. The type and shape of a suitable substrate 102 would be apparent to one of ordinary skill in the art. According to the present disclosure, preferred substrate 102 materials may be ceramic material.

According to an embodiment, washcoat 104 for SPGM catalyst system Type 1 100, and SPGM catalyst system Type 3 300 may include a Cu—Mn stoichiometric spinel, $Cu_{1.0}Mn_{2.0}O_4$, as non PGM metal catalyst. Additionally, washcoat 104 may include support oxide such as zirconium oxide, doped zirconia. According to the present disclosure, suitable material for disclosed washcoat 104 may be $Nb_2O_5$—$ZrO_2$.

According to an embodiment, washcoat 104 for PGM catalyst system Type 2 200 and PGM catalyst system Type 4 400 may include support oxide such as zirconium oxide, doped zirconia. According to the present disclosure, suitable material for disclosed washcoat 104 may be $Nb_2O_5$—$ZrO_2$.

According to embodiments of the present disclosure, overcoat 106 for SPGM catalyst system Type 1 100, PGM catalyst system Type 2 200, SPGM catalyst system Type 3 300, and PGM catalyst system Type 4 400 may include aluminum oxide, doped aluminum oxide, zirconium oxide, doped zirconia, titanium oxide, tin oxide, silicon dioxide, zeolite, and mixtures thereof. According to the present disclosure, most suitable material for disclosed overcoat 106 may be alumina ($Al_2O_3$).

Additionally, overcoat 106 for SPGM catalyst system Type 1 100 and PGM catalyst system Type 2 200 may include Pd and Rh. Moreover, overcoat 106 for SPGM catalyst system Type 3 300 and PGM catalyst system Type 4 400 may include Pt and Rh.

According to embodiments of the present disclosure PGM catalyst system Type 2 200 has the same configuration as SPGM catalyst system Type 1 100 in which Cu—Mn spinel is removed from washcoat 104, in order to demonstrate the effect of addition of Cu—Mn spinel to PGM catalyst system Type 2 200. Similarly, PGM catalyst system Type 4 400 has the same configuration as SPGM catalyst system Type 3 300 in which Cu—Mn spinel is removed from washcoat 104, in order to demonstrate the effect of addition of Cu—Mn spinel to PGM catalyst system Type 4 400.

Preparation of SPGM Catalyst System Type 1 and SPGM Catalyst System Type 3 (with Cu—Mn Spinel)

The preparation of washcoat 104 may begin by milling $Nb_2O_5$—$ZrO_2$ support oxide to make aqueous slurry. The $Nb_2O_5$—$ZrO_2$ support oxide may have $Nb_2O_5$ loadings of about 15% to about 30% by weight, preferably about 25% and $ZrO_2$ loadings of about 70% to about 85% by weight, preferably about 75%.

The Cu—Mn solution may be prepared by mixing for about 1 to 2 hours, an appropriate amount of Mn nitrate solution ($Mn(NO_3)_2$) and Cu nitrate solution ($CuNO_3$). Subsequently, Cu—Mn nitrate solution may be mixed with $Nb_2O_5$—$ZrO_2$ support oxide slurry for about 2 to 4 hours, where Cu—Mn nitrate solution may be precipitated on $Nb_2O_5$—$ZrO_2$ support oxide aqueous slurry. A suitable base solution may be added, such as to adjust the pH of the slurry to a suitable range. The precipitated Cu—Mn/$Nb_2O_5$—$ZrO_2$ slurry may be aged for a period of time of about 12 to 24 hours under continued stirring at room temperature.

Subsequently, the precipitated slurry may be coated on substrate 102. The aqueous slurry of Cu—Mn/$Nb_2O_5$—$ZrO_2$ may be deposited on the suitable ceramic substrate 102 to form washcoat 104, employing vacuum dosing and coating systems. In the present disclosure, a plurality of capacities of washcoat 104 loadings may be coated on the suitable ceramic substrate 102. The plurality of washcoat 104 loading may vary from about 60 g/L to about 200 g/L, in the present disclosure particularly about 120 g/L. Subsequently, after deposition on ceramic substrate 102 of the suitable loadings of Cu—Mn/$Nb_2O_5$—$ZrO_2$ slurry, washcoat 104 may be dried overnight at about 120° C. and subsequently calcined at a suitable temperature within a range of about 550° C. to about 650° C., preferably at about 600° C. for about 5 hours. Treatment of washcoat 104 may be enabled employing suitable drying and heating processes. A commercially-available air knife drying systems may be employed for drying washcoat 104. Heat treatments (calcination) may be performed using commercially-available firing (furnace) systems.

Overcoat 106 for SPGM catalyst system Type 1 100 may include a combination of Pd and Rh on alumina-based support. The preparation of overcoat 106 may begin by milling the alumina-based support oxide separately to make aqueous slurry. Subsequently, solutions of Pd nitrate and Rh nitrate may be mixed with the aqueous slurry of alumina with a loading of Pd and Rh within a range from about 0.5 g/ft$^3$ to about 10 g/ft$^3$. For the present disclosure, suitable Pd loading may be of about 0.5 g/ft$^3$, and suitable loading for Rh may be of about 0.5 g/ft$^3$. Total loading of washcoat 104 material may be 120 g/L. After mixing of Pd, Rh, and alumina slurry, Pd and Rh may be locked down with an appropriate amount of one or more base solutions, such as sodium hydroxide (NaOH) solution, sodium carbonate (Na$_2$CO$_3$) solution, ammonium hydroxide (NH$_4$OH) solution, tetraethyl ammonium hydroxide (TEAH) solution, among others. In the present embodiment, Pd and Rh may be locked down using a base solution of tetraethyl ammonium hydroxide (TEAH). Then, the resulting slurry may be aged from about 12 hours to about 24 hours for subsequent coating as overcoat 106 on washcoat 104, dried and fired at about 550° C. for about 4 hours.

Similarly, Overcoat 106 for SPGM catalyst system Type 3 300 may include a combination of Pt and Rh on alumina-based support. The preparation of overcoat 106 may begin by milling the alumina-based support oxide separately to make aqueous slurry. Subsequently, solutions of Pt nitrate and Rh nitrate may be mixed with the aqueous slurry of alumina with a loading of Pt and Rh within a range from about 0.5 g/ft$^3$ to about 10 g/ft$^3$. For the present disclosure, suitable Pt loading may be of about 0.5 g/ft$^3$, and suitable loading for Rh may be of about 0.5 g/ft$^3$. Total loading of washcoat 104 material may be 120 g/L. After mixing of Pt, Rh, and alumina slurry, Pt and Rh may be locked down with an appropriate amount of one or more base solutions, such as sodium hydroxide (NaOH) solution, sodium carbonate (Na$_2$CO$_3$) solution, ammonium hydroxide (NH$_4$OH) solution, tetraethyl ammonium hydroxide (TEAH) solution, among others. In the present embodiment, Pt and Rh may be locked down using a base solution of tetraethyl ammonium hydroxide (TEAH). Then, the resulting slurry may be aged from about 12 hours to about 24 hours for subsequent coating as overcoat 106 on washcoat 104, dried and fired at about 550° C. for about 4 hours.

Preparation of PGM Catalyst System Type 2 and PGM Catalyst System Type 4 (without Cu—Mn Spinel)

The preparation of washcoat 104 may begin by milling Nb$_2$O$_5$—ZrO$_2$ support oxide to make aqueous slurry. The Nb$_2$O$_5$—ZrO$_2$ support oxide may have Nb$_2$O$_5$ loadings of about 15% to about 30% by weight, preferably about 25% and ZrO$_2$ loadings of about 70% to about 85% by weight, preferably about 75%.

Subsequently, washcoat 104 slurry may be coated on substrate 102. The washcoat 104 slurry may be deposited on the suitable ceramic substrate 102 to form washcoat 104, employing vacuum dosing and coating systems. In the present disclosure, a plurality of capacities of washcoat 104 loadings may be coated on suitable ceramic substrate 102. The washcoat 104 loading may be of about 120 g/L. Washcoat 104 may be dried overnight at about 120° C. and subsequently calcined at a suitable temperature within a range of about 550° C. to about 650° C., preferably at about 550° C. for about 4 hours. Treatment of washcoat 104 may be enabled employing suitable drying and heating processes. A commercially-available air knife drying systems may be employed for drying washcoat 104. Heat treatments (calcination) may be performed using commercially-available firing (furnace) systems.

Overcoat 106 for PGM Catalyst System Type 2 200 may include a combination of Pd and Rh on alumina-based support. The preparation of overcoat 106 may begin by milling the alumina-based support oxide separately to make aqueous slurry. Subsequently, solutions of Pd nitrate and Rh nitrate may be mixed with the aqueous slurry of alumina with a loading of Pd and Rh within a range from about 0.5 g/ft$^3$ to about g/ft$^3$. For the present disclosure, suitable Pd loading may be of about 0.5 g/ft$^3$, and suitable loading for Rh may be of about 0.5 g/ft$^3$. Total loading of washcoat 104 material may be 120 g/L. After mixing of Pd, Rh, and alumina slurry, Pd and Rh may be locked down with an appropriate amount of one or more base solutions, such as sodium hydroxide (NaOH) solution, sodium carbonate (Na$_2$CO$_3$) solution, ammonium hydroxide (NH$_4$OH) solution, tetraethyl ammonium hydroxide (TEAH) solution, among others. In the present embodiment, Pt and Rh may be locked down using a base solution of tetraethyl ammonium hydroxide (TEAH). Then, the resulting slurry may be aged from about 12 hours to about 24 hours for subsequent coating as overcoat 106 on washcoat 104, dried and fired at about 550° C. for about 4 hours.

Similarly, Overcoat 106 for PGM Catalyst System Type 4 400 may include a combination of Pt and Rh on alumina-based support. The preparation of overcoat 106 may begin by milling the alumina-based support oxide separately to make aqueous slurry. Subsequently, solutions of Pt nitrate and Rh nitrate may be mixed with the aqueous slurry of alumina with a loading of Pt and Rh within a range from about 0.5 g/ft$^3$ to about 10 g/ft$^3$. For the present disclosure, suitable Pt loading may be of about 0.5 g/ft$^3$, and suitable loading for Rh may be of about 0.5 g/ft$^3$. Total loading of washcoat 104 material may be 120 g/L. After mixing of Pt, Rh, and alumina slurry, Pt and Rh may be locked down with an appropriate amount of one or more base solutions, such as sodium hydroxide (NaOH) solution, sodium carbonate (Na$_2$CO$_3$) solution, ammonium hydroxide (NH$_4$OH) solution, tetraethyl ammonium hydroxide (TEAH) solution, among others. In the present embodiment, Pd and Rh may be locked down using a base solution of tetraethyl ammonium hydroxide (TEAH). Then, the resulting slurry may be aged from about 12 hours to about 24 hours for subsequent coating as overcoat 106 on washcoat 104, dried and fired at about 550° C. for about 4 hours.

Fresh, hydrothermally aged, and fuel cut aged samples for each of the bimetallic catalyst formulations and configurations in present disclosure may be prepared to show the synergistic effect of adding Cu—Mn spinel to PGM catalyst materials which may be used in TWC applications.

In order to compare TWC performance of disclosed SPGM catalyst system Type 1 100, PGM catalyst system Type 2 200, SPGM catalyst system Type 3 300, and PGM catalyst system Type 4 400, isothermal steady state sweep tests may be performed.

Isothermal Steady State Sweep Test Procedure

The isothermal steady state sweep test may be carried out employing a flow reactor in which the inlet temperature may be increased to about 450° C., and testing a gas stream at 11-point R-values from about 2.0 (rich condition) to about 0.80 (lean condition) to measure the CO, NO, and HC conversions.

The space velocity (SV) in the flow reactor may be adjusted at about 40,000 h$^{-1}$. The gas feed employed for the test may be a standard TWC gas composition, with variable O$_2$ concentration in order to adjust R-value from rich condition to lean condition during testing. The standard TWC gas composition may include about 8,000 ppm of CO, about 400 ppm of C$_3$H$_6$, about 100 ppm of C$_3$H$_8$, about 1,000 ppm of NO$_x$, about 2,000 ppm of H$_2$, 10% of CO$_2$, and 10% of H$_2$O. The quantity of O$_2$ in the gas mix may be varied to adjust R-value which is representative of Air/Fuel (A/F) ratio.

EXAMPLES

Example #1

Pd/Rh Bimetallic SPGM Catalyst Systems Performance Comparison

Example #1 includes Pd/Rh bimetallic catalyst systems, such as SPGM catalyst system Type 1 100 and PGM catalyst system Type 2 200.

NOx Conversion Comparison of SPGM Catalyst System Type 1 and PGM Catalyst System Type 2

Figure 5:
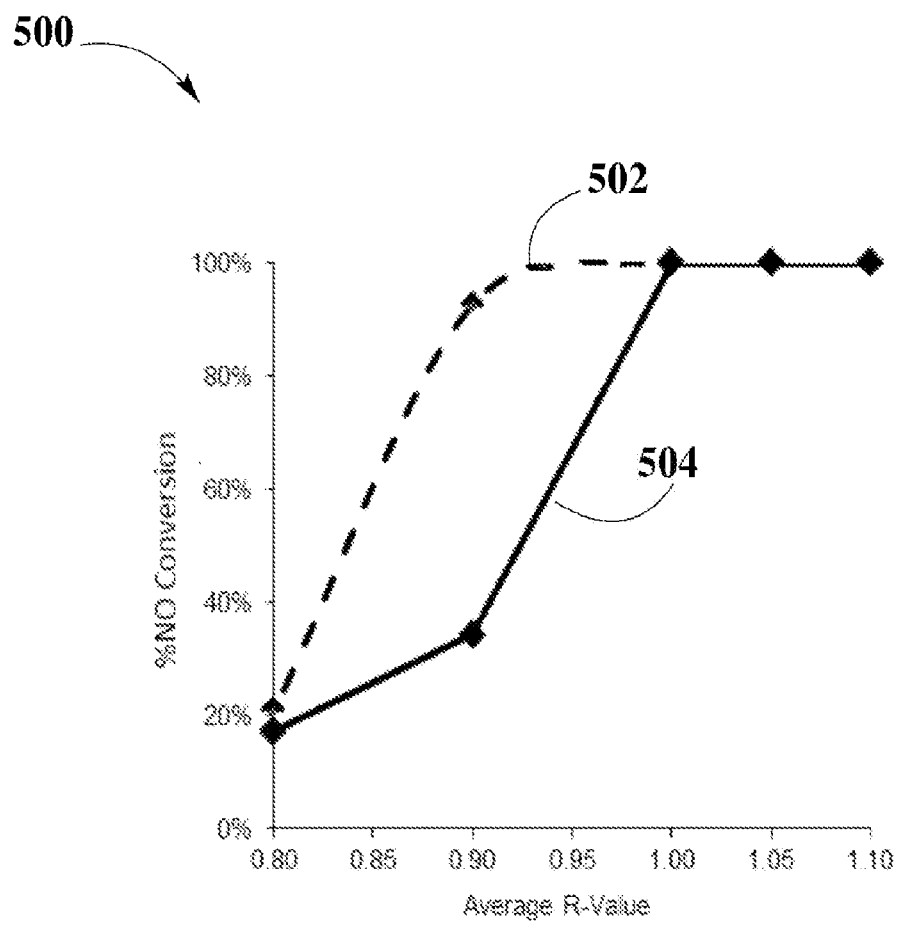
FIG. 5 depicts NOx conversion comparison for fresh samples of SPGM catalyst system Type 1 and PGM catalyst system Type 2, under isothermal steady state sweep condition, at inlet temperature of about 450° C., and SV of about 40,000 h$^{-1}$, according to an embodiment.

FIG. 5 depicts NOx conversion comparison 500 for fresh samples of SPGM catalyst system Type 1 100 and fresh samples of PGM catalyst system Type 2 200, under isothermal steady state sweep condition, at inlet temperature of about 450° C. and SV of about 40,000 h$^{-1}$, according to an embodiment.

As shown in FIG. 5, NO conversion curve 502 (dashed line) illustrates performance of SPGM catalyst system Type 1 100, and NO conversion curve 504 (solid line) shows performance of PGM catalyst system Type 2 200, under isothermal steady state sweep condition.

As may be observed in NOx conversion comparison 500, disclosed fresh SPGM catalyst system Type 1 100 may perform better than disclosed fresh PGM catalyst system Type 2 200, because of their improved NOx conversion under lean condition. For example, as shown in FIG. 5, at lean condition, R-value of about 0.9, while fresh SPGM catalyst system Type 1 100 shows NO$_x$ conversion of about 92.8%, fresh PGM catalyst system Type 2 200 shows NO$_x$ conversion of about 34.5%.

As may be seen in lean NOx conversion comparison 500, for fresh samples, there is an improved performance in NO$_x$ conversion for disclosed Pd/Rh SPGM catalyst system Type 1 100, under lean condition (R-value<1.00) as compared to Pd/Rh PGM catalyst system Type 2 200. This improved performance is the result of the synergistic effect between Pd/Rh, and the Cu—Mn spinel components in the respective composition of SPGM catalyst system Type 1 100, in which adding of Cu—Mn spinel components is responsible for the improved performance of NO$_x$ conversion under lean condition compared with the level of NO$_x$ conversion of PGM catalyst system Type 2 200 shown in NOx conversion comparison 500.

In addition, fresh samples of SPGM catalyst system Type 1 100 and fresh samples of PGM catalyst system Type 2 200 present NO$_x$ conversion of about 100% at R-value of about 1.00, which is the stoichiometric R-value for PGM catalyst.

Figure 6:
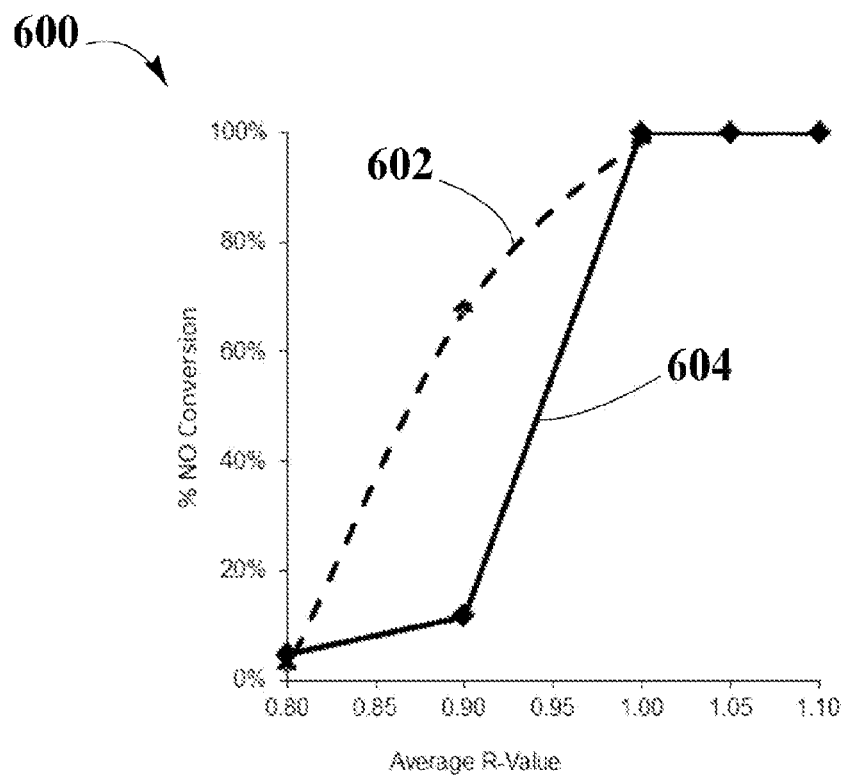
FIG. 6 depicts NOx conversion comparison for hydrothermally aged samples (at 900° C. during about 4 hours) of SPGM catalyst system Type 1 and PGM catalyst system Type 2, under isothermal steady state sweep condition, at inlet temperature of about 450° C., and SV of about 40,000 $h^{-1}$, according to an embodiment.

FIG. 6 depicts NOx conversion comparison 600 for hydrothermally aged samples (at 900° C. during about 4 hours) of SPGM catalyst system Type 1 100; and hydrothermally aged samples (at 900° C. during about 4 hours) of PGM catalyst system Type 2 200, under isothermal steady state sweep condition, at inlet temperature of about 450° C. and SV of about 40,000 h$^{-1}$, according to an embodiment.

In FIG. 6, NOx conversion curve 602 (dashed line) shows performance of SPGM catalyst system Type 1 100, NOx conversion curve 604 (solid line) depicts performance of PGM catalyst system Type 2 200, under isothermal steady state sweep condition.

As may be observed in NOx conversion comparison 600, disclosed SPGM catalyst system Type 1 100 after hydrothermal aging may perform better than disclosed PGM catalyst system Type 2 200 after same hydrothermal aging, because of their improved NOx conversion under lean condition. For example, as shown in FIG. 6, at lean condition, R-value of about 0.9, while hydrothermally aged SPGM catalyst system Type 1 100 shows NO$_x$ conversion of about 67.6%, hydrothermally aged PGM catalyst system Type 2 200 shows NO$_x$ conversion of about 11.7%.

As may be seen in lean NOx conversion comparison 600, for hydrothermally aged samples, there is an improved performance in NO$_x$ conversion for disclosed SPGM catalyst system Type 1 100, under lean condition (R-value<1.00) as compared to PGM catalyst system Type 2 200. This improved performance is the result of the synergistic effect between Pd/Rh, and the Cu—Mn spinel components in the respective composition of SPGM catalyst system Type 1 100, in which adding of Cu—Mn spinel components is responsible for the improved performance of NO$_x$ conversion under lean condition compared with the level of NO$_x$ conversion of PGM catalyst system Type 2 200 shown in NOx conversion comparison 600.

In addition, samples of hydrothermally aged SPGM catalyst system Type 1 100 present NOx conversion of about 100% at R-value of about 1.00, which is the stoichiometric R-value for PGM catalysts and greater NOx conversion at R-value<1.00, showing thermal stability of disclosed bimetallic Pd/Rh SPGM catalyst system.

CO Conversion Comparison of SPGM Catalyst System Type 1 and PGM Catalyst System Type 2

Figure 7:
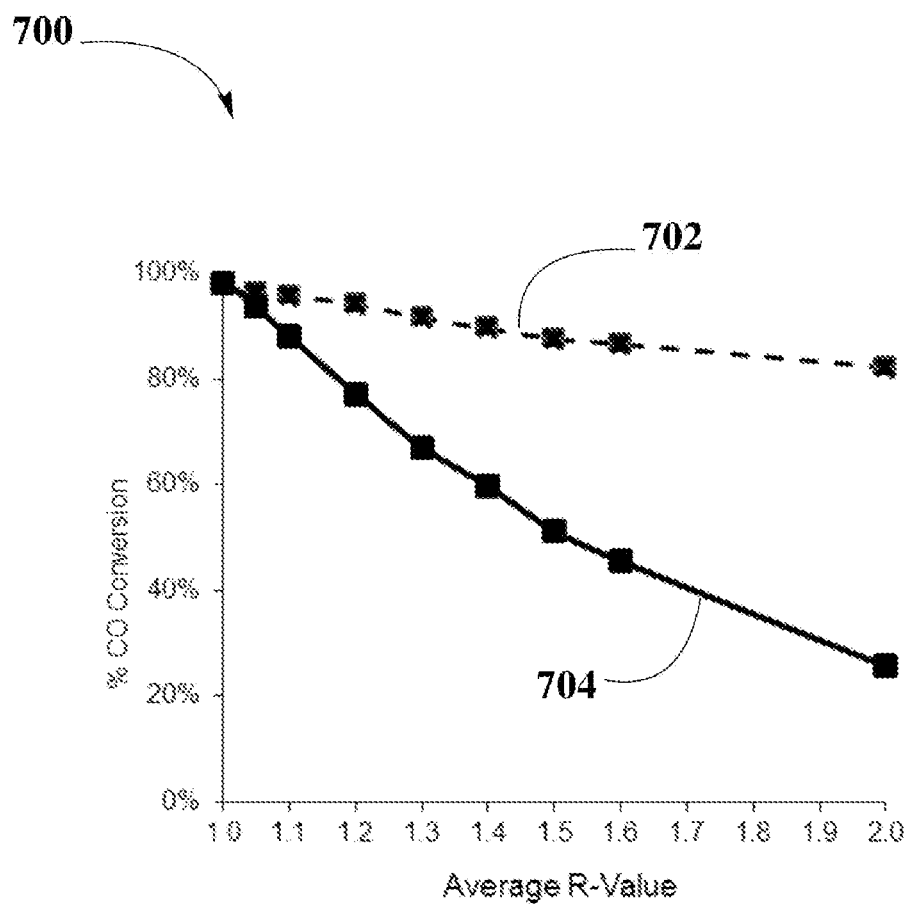
FIG. 7 depicts CO conversion comparison for hydrothermally aged samples (at 900° C. during about 4 hours) of SPGM catalyst system Type 1 and PGM catalyst system Type 2, under isothermal steady state sweep condition, at inlet temperature of about 450° C., and SV of about 40,000 $h^{-1}$, according to an embodiment.

FIG. 7 depicts CO conversion comparison 700 for hydrothermally aged samples (at 900° C. during about 4 hours) of SPGM catalyst system Type 1 100 and hydrothermally aged samples (at 900° C. during about 4 hours) of PGM catalyst system Type 2 200, under isothermal steady state sweep condition, at inlet temperature of about 450° C., and SV of about 40,000 h$^{-1}$, according to an embodiment.

In FIG. 7, CO conversion comparison 700, CO conversion curve 702 (dashed line) shows performance of SPGM catalyst system Type 1 100 after hydrothermally aging, NOx conversion curve 704 (solid line) depicts performance of PGM catalyst system Type 2 200 after hydrothermally aging.

As may be observed in CO conversion comparison 700, disclosed SPGM catalyst system Type 1 100 after hydrothermally aging may perform better than disclosed PGM catalyst system Type 2 200 after same hydrothermal aging, because of their improved CO conversion under rich condition. For example, as shown in FIG. 7, at fully rich condition, R-value of about 2.0, while SPGM catalyst system Type 1 100 shows CO conversion of about 81.5%, PGM catalyst system Type 2 200 shows CO conversion of about 31.6%.

As may be observed in CO conversion comparison 700, for hydrothermally aged samples there is an improved performance in CO conversion for disclosed SPGM catalyst system Type 1 100, under rich condition as compared to PGM catalyst system Type 2 200. This improved performance of SPGM catalysts is the result of the synergistic effect between Pd/Rh, and the Cu—Mn spinel components in the respective composition of SPGM catalyst system Type 1 100, in which adding the Cu—Mn spinel components is responsible for the improved performance of CO conversion under rich condition compared to the level of CO conversion of PGM catalyst system Type 2 200, shown in CO conversion comparison 800.

In addition, samples of hydrothermally aged SPGM catalyst system Type 1 100 present CO conversion of about 100% at R-value of about 1.00, which is the stoichiometric R-value for PGM catalysts and shows stable CO conversion at full range of R-value, indicating thermal stability of disclosed bimetallic Pd/Rh SPGM catalyst system.

Figure 8:
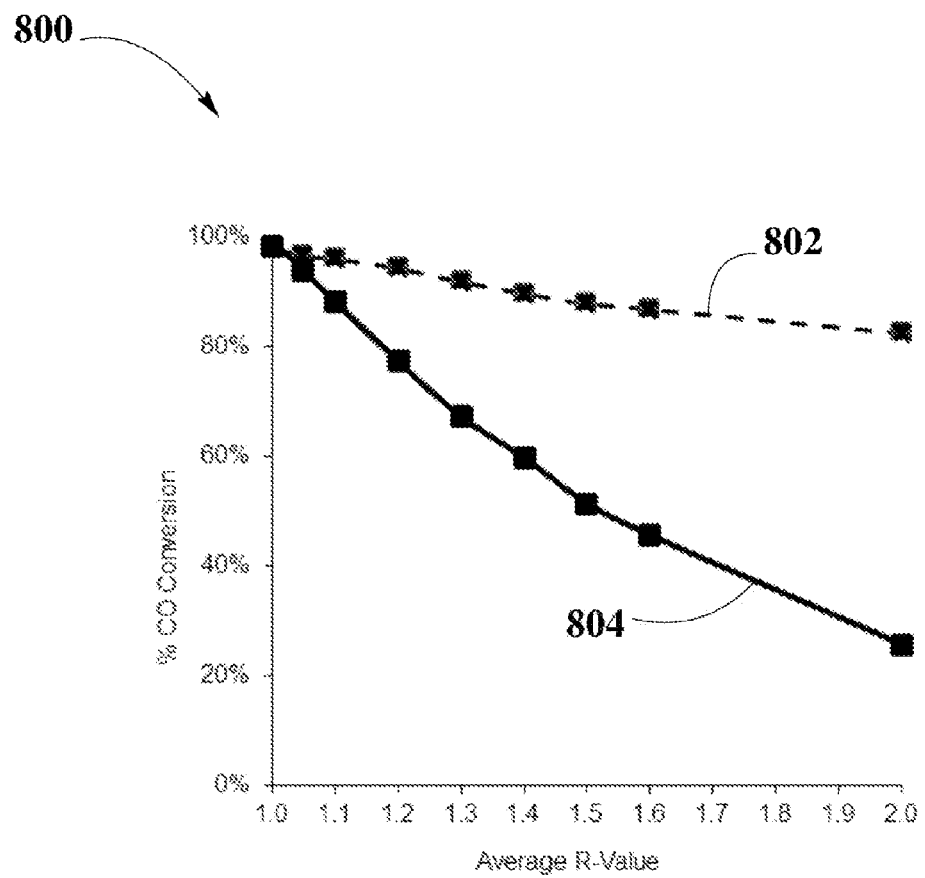
FIG. 8 depicts CO conversion comparison for fuel cut aged samples (at 800° C. during about 20 hours) of SPGM catalyst system Type 1 and PGM catalyst system Type 2, under isothermal steady state sweep condition, at inlet temperature of about 450° C., and SV of about 40,000 $h^{-1}$, according to an embodiment.

FIG. 8 depicts CO conversion comparison 800 for fuel cut aged samples (at 800° C. during about 20 hours) of SPGM catalyst system Type 1 100 and fuel cut aged samples (at 800°

C. during about 20 hours) of PGM catalyst system Type 2 200, under isothermal steady state sweep condition, at inlet temperature of about 450° C., and SV of about 40,000 h⁻¹, according to an embodiment.

In FIG. 8, CO conversion curve 802 (dashed line) shows performance of fuel cut aged SPGM catalyst system Type 1 100, CO conversion curve 804 (solid line) depicts performance of fuel cut aged PGM catalyst system Type 2 200, under isothermal steady state sweep condition.

As may be observed in CO conversion comparison 800, disclosed fuel cut aged SPGM catalyst system Type 1 100 may perform better than disclosed fuel cut aged PGM catalyst system Type 2 200, because of their improved CO conversion under rich condition. For example, as shown in FIG. 8, at fully rich condition, R-value of about 2.0, while SPGM catalyst system Type 1 100 shows CO conversion of about 82.3%, PGM catalyst system Type 2 200 shows CO conversion of about 25.6%.

As may be observed in CO conversion comparison 800, for fuel cut aged samples there is an improved performance in CO conversion for disclosed SPGM catalyst system Type 1 100, under rich condition as compared to PGM catalyst system Type 2 200. This improved performance of SPGM catalysts is the result of the synergistic effect between Pd/Rh, and the Cu—Mn spinel components in the respective composition of SPGM catalyst system Type 1 100, in which adding the Cu—Mn spinel components is responsible for the improved performance of CO conversion under rich condition compared to the level of CO conversion of PGM catalyst system Type 2 200, shown in CO conversion comparison 800.

Example #2

Pt/Rh Bimetallic SPGM Catalyst Systems Performance Comparison

Example #2 includes Pt/Rh bimetallic catalyst systems, such as SPGM catalyst system Type 3 300 and PGM catalyst system Type 4 400.

NOx Conversion Comparison of SPGM Catalyst System Type 3 and PGM Catalyst System Type 4

Figure 9:
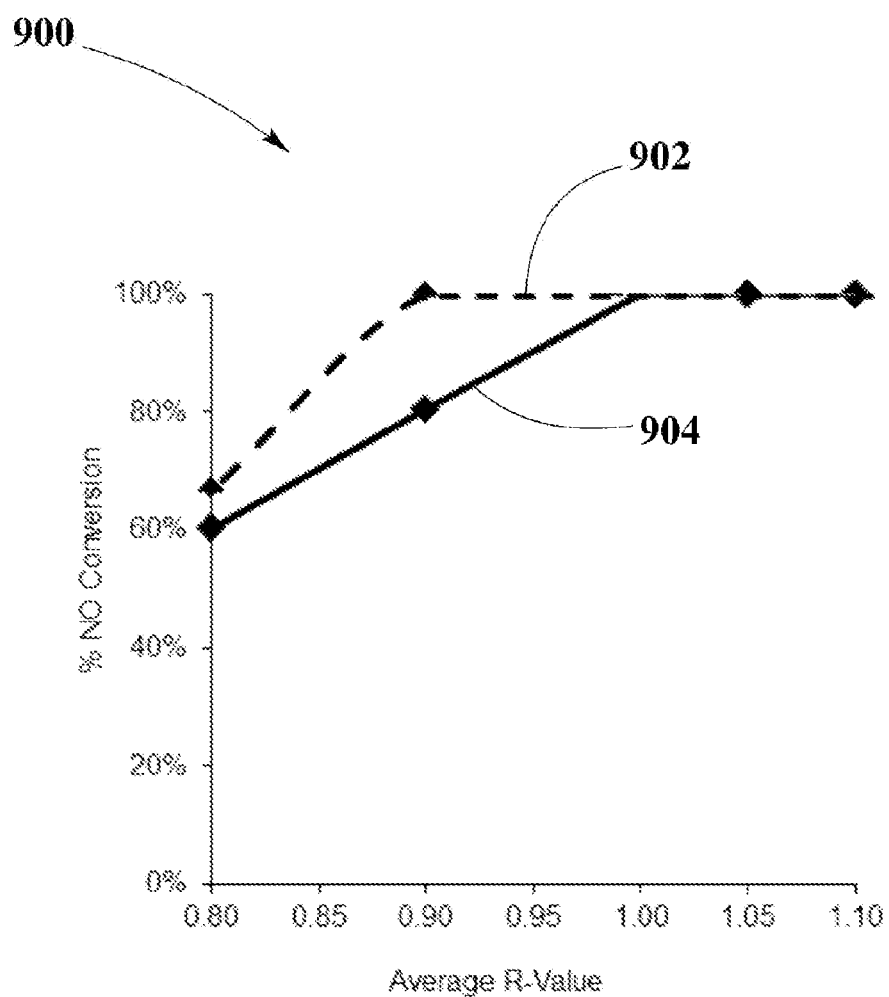
FIG. 9 depicts NOx conversion comparison for fresh samples of SPGM catalyst system Type 3 and PGM catalyst system Type 4, under isothermal steady state sweep condition, at inlet temperature of about 450° C., and SV of about 40,000 $h^{-1}$, according to an embodiment.

FIG. 9 depicts NOx conversion comparison 900 for fresh samples of SPGM catalyst system Type 3 300 and fresh samples of PGM catalyst system Type 4 400, under isothermal steady state sweep condition, at inlet temperature of about 450° C., and SV of about 40,000 h⁻¹, according to an embodiment.

As shown in FIG. 9, NO conversion curve 902 (dashed line) illustrates performance of SPGM catalyst system Type 3 300, and NO conversion curve 904 (solid line) shows performance of PGM catalyst system Type 4 400, under isothermal steady state sweep condition.

As may be observed in NOx conversion comparison 900, disclosed fresh SPGM catalyst system Type 3 300 may perform better than disclosed fresh PGM catalyst system Type 4 400, because of their improved NOx conversion under lean condition. For example, as shown in FIG. 9, at lean condition, R-value of about 0.9, while fresh SPGM catalyst system Type 3 300 shows $NO_x$ conversion of about 100%, fresh PGM catalyst system Type 4 400 shows $NO_x$ conversion of about 80.5%.

As may be seen in lean NOx conversion comparison 900, for fresh samples, there is an improved performance in $NO_x$ conversion for disclosed SPGM catalyst system Type 3 300, under lean condition (R-value<1.00) as compared to PGM catalyst system Type 4 400. This improved performance is the result of the synergistic effect between Pt/Rh, and the Cu—Mn spinel components in the respective composition of SPGM catalyst system Type 3 300, in which adding of Cu—Mn spinel components is responsible for the improved performance of $NO_x$ conversion under lean condition compared with the level of $NO_x$ conversion of PGM catalyst system Type 4 400 shown in NOx conversion comparison 900.

In addition, fresh samples of SPGM catalyst system Type 3 300 and of fresh samples of PGM catalyst system Type 4 400 present $NO_x$ conversion of about 100% at R-value of about 1.00, which is the stoichiometric R-value for PGM catalysts.

Figure 10:
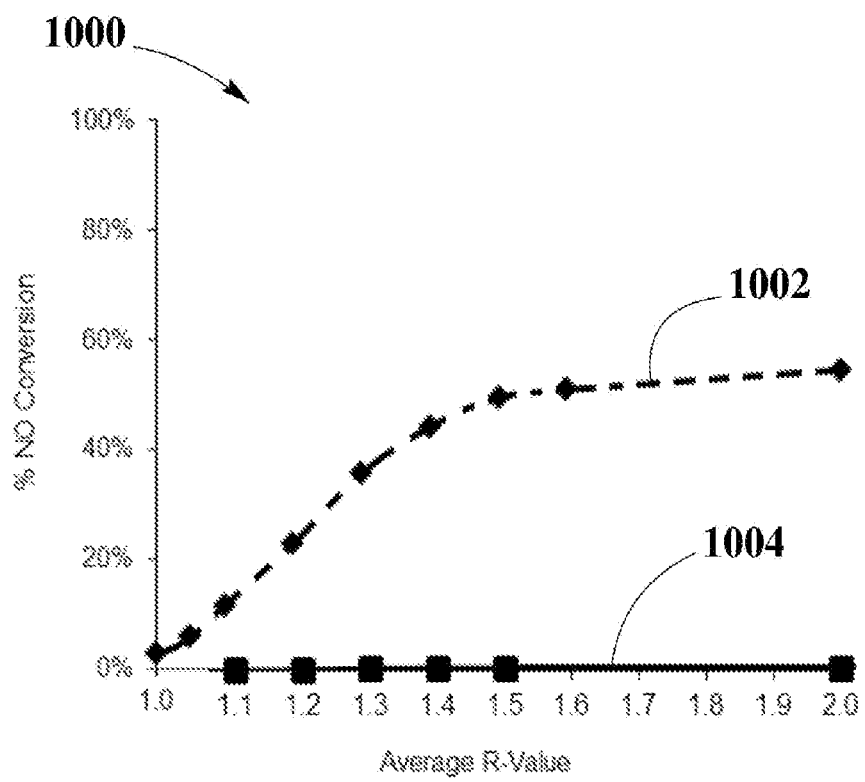
FIG. 10 depicts NOx conversion comparison for hydrothermally aged samples (at 900° C. during about 4 hours) of SPGM catalyst system Type 3 and PGM catalyst system Type 4, under isothermal steady state sweep condition, at inlet temperature of about 450° C., and SV of about 40,000 $h^{-1}$, according to an embodiment.

FIG. 10 depicts NOx conversion comparison 1000 for hydrothermally aged samples (at 900° C. during about 4 hours) of SPGM catalyst system Type 3 300 and hydrothermally aged samples (at 900° C. during about 4 hours) of PGM catalyst system Type 4 400, under isothermal steady state sweep condition, at inlet temperature of about 450° C., and SV of about 40,000 h⁻¹, according to an embodiment.

In FIG. 10, NOx conversion curve 1002 (dashed line) shows performance of SPGM catalyst system Type 3 300, NOx conversion curve 1004 (solid line) depicts performance of PGM catalyst system Type 4 400, under isothermal steady state sweep condition.

As may be observed in NOx conversion comparison 1000, disclosed SPGM catalyst system Type 3 300 after hydrothermal aging may perform better than disclosed PGM catalyst system Type 4 400 after same hydrothermal aging, because of their improved NOx conversion. For example, as shown in FIG. 10, at all R-values region PGM catalyst system Type 4 400 shows no activity on NOx conversion, this may be because Pt/Rh catalyst may be passivated by aging treatment (at 900° C. during about 4 hours). Moreover, SPGM catalyst system Type 3 300 shows catalytic activity of about 50.9% at R value of about 1.6 and of about 54.5% at fully rich condition, R-value of about 2.0. Since Pt/Rh may be passivated by the aging treatment, the catalytic activity of aged SPGM catalyst system Type 3 300 may be achieved only by the Cu—Mn spinel components in the composition of SPGM catalyst system Type 3 300 in which adding the Cu—Mn spinel components is responsible for the performance of NO conversion under rich condition compared to no NOx conversion of PGM catalyst system Type 4 400, shown in NOx conversion comparison 1000.

As may be seen in NOx conversion comparison 1000, for hydrothermally aged samples, there is an improved performance in $NO_x$ conversion for disclosed SPGM catalyst system Type 3 300 as compared to PGM catalyst system Type 4 400. This improved performance is the result of the synergistic effect between Pt/Rh, and the Cu—Mn spinel components in the respective composition of SPGM catalyst system Type 3 300, in which adding of Cu—Mn spinel components is responsible for the improved performance of $NO_x$ conversion compared with the level of $NO_x$ conversion of PGM catalyst system Type 4 400 shown in NOx conversion comparison 1000.

CO Conversion Comparison of SPGM Catalyst System Type 3 and PGM Catalyst System Type 4

Figure 11:
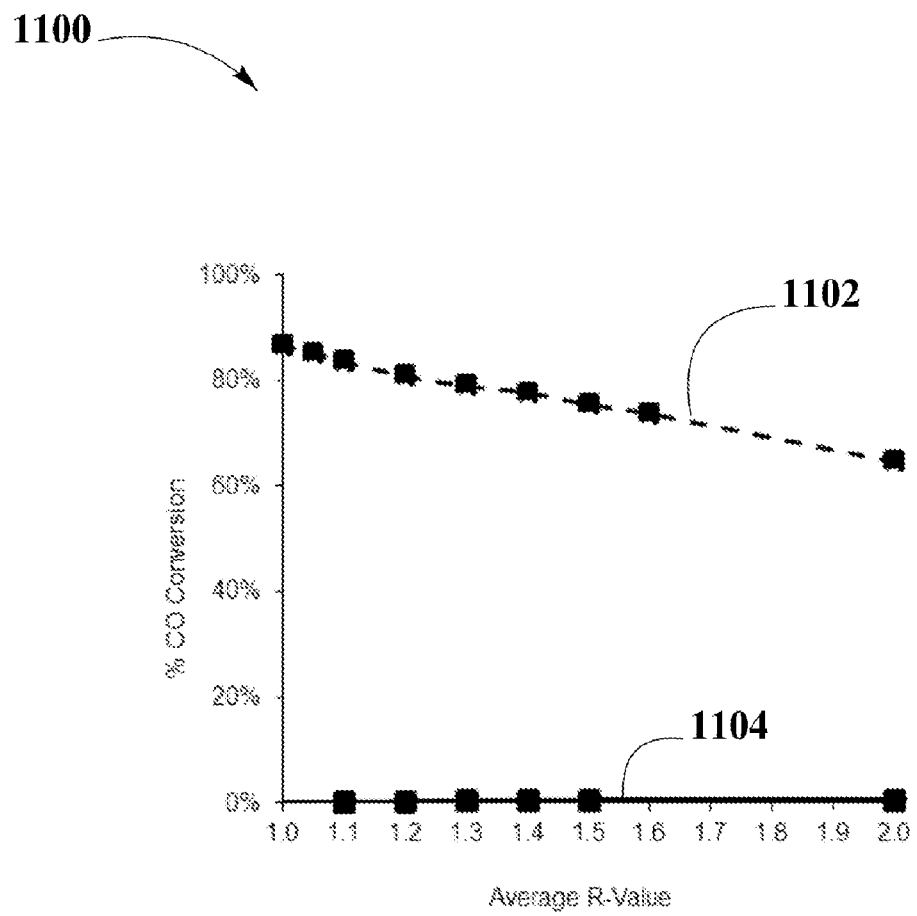
FIG. 11 depicts CO conversion comparison for hydrothermally aged samples (at 900° C. during about 4 hours) of SPGM catalyst system Type 3 and PGM catalyst system Type 4, under isothermal steady state sweep condition, at inlet temperature of about 450° C., and SV of about 40,000 $h^{-1}$, according to an embodiment.

FIG. 11 depicts CO conversion comparison 1100 for hydrothermally aged samples (at 900° C. during about 4 hours) of SPGM catalyst system Type 3 300 and hydrothermally aged samples (at 900° C. during about 4 hours) of PGM catalyst system Type 4 400, under isothermal steady state sweep condition, at inlet temperature of about 450° C., and SV of about 40,000 h⁻¹, according to an embodiment.

In FIG. 11, CO conversion comparison 1100, CO conversion curve 1102 (dashed line) shows performance of SPGM catalyst system Type 3 300 after hydrothermally aging, NOx conversion curve 1104 (solid line) depicts performance of PGM catalyst system Type 4 400 after hydrothermally aging.

As may be observed in CO conversion comparison 1100, disclosed SPGM catalyst system Type 3 300 after hydrothermally aging may perform better than disclosed PGM catalyst system Type 4 400 after same hydrothermal aging, because of their improved CO conversion under rich condition. For example, as shown in FIG. 11, at all R-values region PGM catalyst system Type 4 400 shows no activity on CO conversion, this may be because Pt/Rh catalyst may be passivated by aging treatment (at 900° C. during about 4 hours). Moreover, SPGM catalyst system Type 3 300 shows catalytic activity of about 86.4% at stoichiometric condition, R value of about 1.0, and about 64.6% at fully rich condition, R-value of about 2.0. Since Pt/Rh may be passivated by the aging treatment, the catalytic activity of aged SPGM catalyst system Type 3 300 may be achieved only by the Cu—Mn spinel components in the composition of SPGM catalyst system Type 3 300 in which adding the Cu—Mn spinel components is responsible for the performance of CO conversion under rich condition compared to no CO conversion of PGM catalyst system Type 4 400, shown in CO conversion comparison 1100.

As may be observed in CO conversion comparison 1100, for hydrothermally aged samples there is an improved performance in CO conversion for disclosed SPGM catalyst system Type 3 300 as compared to PGM catalyst system Type 4 400. This improved performance of SPGM catalysts is the result of the synergistic effect between Pt/Rh, and the Cu—Mn spinel components in the respective composition of SPGM catalyst system Type 3 300, in which adding the Cu—Mn spinel components is responsible for the improved performance of CO conversion and thermal stability compared to PGM catalyst system Type 4 400, shown in CO conversion comparison 1100.

Figure 12:
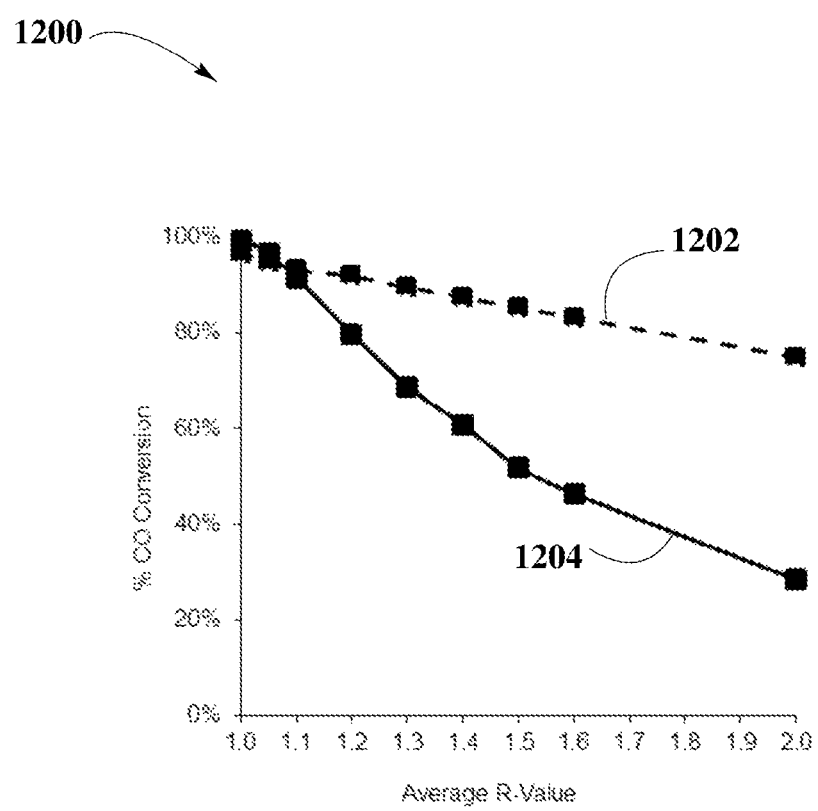
FIG. 12 depicts CO conversion comparison for fuel cut aged samples (at 800° C. during about 20 hours) of SPGM catalyst system Type 3 and PGM catalyst system Type 4, under isothermal steady state sweep condition, at inlet temperature of about 450° C., and SV of about 40,000 $h^{-1}$, according to an embodiment.

FIG. 12 depicts CO conversion comparison 1200 for fuel cut aged samples (at 800° C. during about 20 hours) of SPGM catalyst system Type 3 300 and fuel cut aged samples (at 800° C. during about 20 hours) of PGM catalyst system Type 4 400, under isothermal steady state sweep condition, at inlet temperature of about 450° C., and SV of about 40,000 $h^{-1}$, according to an embodiment.

In FIG. 12, CO conversion curve 1202 (dashed line) shows performance of fuel cut aged SPGM catalyst system Type 3 300, CO conversion curve 1204 (solid line) depicts performance of fuel cut aged PGM catalyst system Type 4 400, under isothermal steady state sweep condition.

As may be observed in CO conversion comparison 1200, disclosed fuel cut aged SPGM catalyst system Type 3 300 may perform better than disclosed fuel cut aged PGM catalyst system Type 4 400, because of their improved CO conversion under rich condition. For example, as shown in FIG. 12, at fully rich condition, R-value of about 2.0, while SPGM catalyst system Type 3 300 shows CO conversion of about 75%, PGM catalyst system Type 4 400 shows CO conversion of about 28.4%.

As may be observed in CO conversion comparison 1200, for fuel cut aged samples there is an improved performance in CO conversion for disclosed SPGM catalyst system Type 3 300 as compared to PGM catalyst system Type 4 400. This improved performance of SPGM catalysts is the result of the synergistic effect between Pt/Rh, and the Cu—Mn spinel components in the respective composition of SPGM catalyst system Type 3 300, in which adding the Cu—Mn spinel components is responsible for the improved performance of CO conversion and thermal stability compared to that of PGM catalyst system Type 4 400, shown in CO conversion comparison 1200.

As may be observed in performance comparison between fresh, hydrothermally aged, and fuel cut aged bimetallic (Pd/Rh) SPGM catalyst system Type 1 100 and fresh, hydrothermally aged, and fuel cut aged bimetallic (Pd/Rh) PGM catalyst system Type 2 200, there is a significant improved performance in NOx conversion under lean conditions for disclosed SPGM catalyst system Type 1 100. This improved performance is the result of the synergistic effect between the PGM component (Pd/Rh) and the ZPGM components (Cu—Mn spinel) in the respective compositions of disclosed SPGM catalyst system Type 1 100, in which adding of ZPGM components is responsible for the performance of NOx conversion when compared with the level of NOx conversion of the PGM catalyst system Type 2 200. Additionally, it has been shown that even after hydrothermally aging treatment, and fuel cut aging treatment, PGM catalysts (Pd/Rh) exhibit significant NOx and CO conversion, which is synergized by Cu—Mn stoichiometric spinel within disclosed bimetallic SPGM catalyst system Type 1 100, therefore, showing thermal stability of Pd/Rh SPGM catalysts.

Performance comparison results may show that disclosed SPGM catalyst system Type 1 100 exhibits high catalytic activity under both lean and rich conditions, resulting in high levels NO conversion and high levels of CO conversions, not only in fresh conditions, but also in hydrothermally aged, and fuel cut aged conditions.

Similarly, performance comparison between fresh bimetallic (Pt/Rh) SPGM catalyst system Type 3 300 and fresh bimetallic (Pt/Rh) PGM catalyst system Type 4 400, there is a significant improved performance in NOx conversion under lean conditions for disclosed SPGM catalyst system Type 3 300. This improved performance is the result of the synergistic effect between the PGM component (Pt/Rh) and the ZPGM components (Cu—Mn stoichiometric spinel) in the respective compositions of disclosed SPGM catalyst system Type 3 300, in which adding of ZPGM components is responsible for the improved performance of NOx conversion when compared with the level of NOx conversion of the PGM catalyst system Type 4 400. Therefore, SPGM catalyst system Type 3 300 exhibits a higher level NOx conversion than PGM catalyst system Type 4 400. Moreover, in performance comparison between hydrothermally aged and fuel cut aged SPGM catalyst system Type 3 300 and hydrothermally aged and fuel cut aged PGM catalyst system Type 4 400, there is high NOx conversion under lean conditions for disclosed SPGM catalyst system Type 3 300, but no NOx conversion, under lean condition, for disclosed PGM catalyst system Type 4 400. This performance is the result of Cu—Mn stoichiometric spinel catalyst activity, which is stable even after hydrothermally aging treatment and fuel cut aging treatment. Disclosed PGM catalyst system Type 4 400 may not exhibit NOx conversion, showing that Pt/Rh catalysts may not be stable at hydrothermally aging and fuel cut aging conditions. Therefore, SPGM catalyst system Type 3 300 exhibits a higher level NOx conversion than PGM catalyst system Type 4 400, in the disclosed conditions, such as fresh conditions, hydrothermally aged conditions, and fuel cut aged conditions.

Furthermore, synergistic effect of Cu—Mn on Pt/Rh bimetallic PGM results is improvement of CO conversion under rich conditions.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A bimetallic synergized platinum group metals (SPGM) catalyst system comprising:
   a) an overcoat comprising a bimetallic PGM catalyst;
   b) a washcoat comprising a Cu—Mn spinel supported on doped $ZrO_2$ support oxide; and
   c) a substrate.

2. The bimetallic SPGM catalyst system of claim 1, wherein the substrate comprises a ceramic material.

3. The bimetallic SPGM catalyst system of claim 2, wherein the bimetallic PGM catalyst is supported on a carrier material oxide.

4. The bimetallic SPGM catalyst system of claim 3, wherein the carrier material oxide is $Al_2O_3$.

5. The bimetallic SPGM catalyst system of claim 3, wherein the carrier material oxide is selected from the group consisting of aluminum oxide, doped aluminum oxide, zirconium oxide, doped zirconia, titanium oxide, tin oxide, silicon dioxide, zeolite, and mixtures thereof.

6. The bimetallic SPGM catalyst system of claim 1, wherein the bimetallic PGM catalyst is palladium/rhodium or platinum/rhodium.

7. The bimetallic SPGM catalyst system of claim 1, wherein the bimetallic PGM catalyst comprises about 0.5 g/ft$^3$ of each metal.

8. The bimetallic SPGM catalyst system of claim 1, wherein the doped $ZrO_2$ support oxide is $Nb_2O_5$—$ZrO_2$.

9. The bimetallic SPGM catalyst system of claim 1, wherein the Cu—Mn spinel is $CuMn_2O_4$.

10. The bimetallic SPGM catalyst system comprising of claim 1, wherein:
    a) the overcoat comprises a palladium-rhodium catalyst supported on alumina;
    b) a washcoat comprises a $CuMn_2O_4$ spinel supported on doped $ZrO_2$; and
    c) the substrate is a ceramic substrate.

11. The bimetallic SPGM catalyst system of claim 10, wherein the SPGM catalyst system converts about 92.8% of nitrogen oxide under lean condition.

12. The bimetallic SPGM catalyst system comprising of claim 10, wherein the SPGM catalyst system converts about 81.5% of carbon monoxide under rich condition.

13. The bimetallic SPGM catalyst system comprising of claim 1, wherein:
    a) the overcoat comprises a platinum-rhodium catalyst supported on alumina;
    b) the washcoat comprises of $CuMn_2O_4$ spinel supported on doped $ZrO_2$; and
    c) the substrate is a ceramic substrate.

14. The bimetallic SPGM catalyst system comprising of claim 13, wherein the SPGM catalyst system converts about 100% of nitrogen oxide under lease condition.

15. The bimetallic SPGM catalyst system comprising of claim 1, wherein the SPGM catalyst system is hydrothermally aged.

16. The bimetallic SPGM catalyst system comprising of claim 15, wherein the hydrothermal aging is an aging treatment of 900° C. for about 4 hours.

17. A method of converting nitrogen oxide and carbon monoxide comprising applying exhaust gas to a bimetallic synergized platinum group metals (SPGM) catalyst system comprising:
    a) an overcoat comprising a bimetallic PGM catalyst;
    b) a washcoat comprising a Cu—Mn spinel supported on doped $ZrO_2$ support oxide; and
    c) a substrate.

18. The method of claim 17, wherein the substrate comprises a ceramic material.

19. The method of claim 18, wherein the bimetallic PGM catalyst is supported on a carrier material oxide.

20. The method of claim 19, wherein the carrier material oxide is $Al_2O_3$.

21. The method of claim 19, wherein the carrier material oxide is selected from the group consisting of aluminum oxide, doped aluminum oxide, zirconium oxide, doped zirconia, titanium oxide, tin oxide, silicon dioxide, zeolite, and mixtures thereof.

22. The method of claim 17, wherein the bimetallic PGM catalyst is palladium/rhodium or platinum/rhodium.

23. The method of claim 17, wherein the bimetallic PGM catalyst comprises about 0.5 g/ft$^3$ of each metal.

24. The method of claim 17, wherein the doped $ZrO_2$ support oxide is $Nb_2O_5$—$ZrO_2$.

25. The method of claim 17, wherein the Cu—Mn spinel is $CuMn_2O_4$.

26. The method of claim 17, wherein:
    a) the overcoat comprises a palladium-rhodium catalyst supported on alumina;
    b) a washcoat comprises a $CuMn_2O_4$ spinel supported on doped $ZrO_2$; and
    c) the substrate is a ceramic substrate.

27. The method of claim 26, wherein the SPGM catalyst system converts about 92.8% of nitrogen oxide under lean condition.

28. The method of claim 26, wherein the SPGM catalyst system converts about 81.5% of carbon monoxide under rich condition.

29. The method of claim 17, wherein:
    a) the overcoat comprises a platinum-rhodium catalyst supported on alumina;
    b) the washcoat comprises of $CuMn_2O_4$ spinel supported on doped $ZrO_2$; and
    c) the substrate is a ceramic substrate.

30. The method of claim 29, wherein the SPGM catalyst system converts about 100% of nitrogen oxide under lease condition.

31. The method of claim 17, wherein the SPGM catalyst system is hydrothermally aged.

32. The method of claim 31, wherein the hydrothermal aging is an aging treatment of 900° C. for about 4 hours.

* * * * *